United States Patent [19]

Rumsey, Jr.

[11] Patent Number: 5,157,854
[45] Date of Patent: Oct. 27, 1992

[54] PADDLE-FISH LANDING NET COMBINATION

[76] Inventor: Joseph F. Rumsey, Jr., 1653 Queenstown Rd., Oklahoma City, Okla. 73116

[21] Appl. No.: 755,756
[22] Filed: Sep. 6, 1991
[51] Int. Cl.$^5$ .............................. A01K 77/00
[52] U.S. Cl. .............................. 43/12; 43/4; 440/101
[58] Field of Search .............. 440/101, 102, 103; 43/12, 7, 11, 4

[56] References Cited

U.S. PATENT DOCUMENTS

| 2,115,082 | 4/1938 | Phillips | 43/12 |
| 2,124,952 | 7/1938 | Norris et al. | 43/12 |
| 2,727,328 | 12/1955 | Dunton | 43/12 |
| 4,031,650 | 6/1977 | Popeil | 43/12 |
| 4,139,961 | 2/1979 | Markos | 43/12 |

FOREIGN PATENT DOCUMENTS 2293145  7/1976  France .............................. 43/12

Primary Examiner—Richard K. Seidel
Assistant Examiner—James Miner
Attorney, Agent, or Firm—Laney, Dougherty, Hessin & Beavers

[57] ABSTRACT

A paddle-fish landing net combination which includes a hollow paddle-shaped housing having a handle opening in an upper side thereof, and a net opening in its opposite, lower side. An elongated handle extends slidably through the handle opening and has an inner end inside the housing. A fish landing net is attached to the handle inner end and nests within the housing when the handle is fully extended upwardly from the housing. The fish landing net moves into an expanded, fish netting position outside the housing when the handle is slidingly pushed into the housing.

7 Claims, 2 Drawing Sheets

PADDLE-FISH LANDING NET COMBINATION

FIELD OF THE INVENTION

This invention relates to a paddle-fishing net combination which can be used in one of its operative positions as paddle for paddling a boat, and in a second operative position as a fish landing net for netting a fish to enable the fish to be boated.

BACKGROUND OF THE INVENTION

Brief Description Of The Present Invention

The present invention provides a useful fishing accessory which can be used at times as a paddle for providing locomotion to a small boat, and which can be used at other times to net a fish which has been hooked and which is to be landed or boated after having been scooped into the net.

Broadly described, the paddle-fish landing net combination of the invention includes a hollow, generally paddle-shaped housing which is truncated at its upper side at the location where the handle of the paddle would normally extend from the described housing. The housing has a handle opening at this truncated upper side where there is a neck located which defines such opening. The housing is also provided with an opening at its opposite side through which a fish net can be moved outwardly to an open, fish netting status at certain times when the net is to be used for landing a fish. A pair of guide elements are secured to the inside of the housing and these function to guide an elongated handle which has an end portion slidingly mounted in the hollow housing. The handle also carries a hand grip on the end of the handle located outside this housing. At the inner end of the handle located within the housing, a fishing net is secured to such inner end and moves with the handle at such times as the handle is slidingly reciprocated through the handle opening in the housing. As the handle is reciprocated to move it further into the hollow housing, the effect is to push the fish net out through the opening at the opposite side of the housing, allowing the fish net to spring to its opened position. The net opens as a resilient hoop to which one side of a flexible net web is attached, and springs out into an oval or circular configuration. At this time, the handle has been pushed a substantial distance into the hollow housing, but still projects sufficiently to permit a user of the device to grip the hand grip at the outer end of the handle, and use this to maneuver the net for purposes of landing a fish which has been hooked after a strike and brought alongside a boat.

The opening through which the net is pushed as the handle is reciprocated is of a size such that the resilient hoop to which the net is attached must be substantially constricted in order to pass through this opening as the net is brought back into the hollow housing for storage at a time when the device is to be used as a boat paddle.

Moreover, the size of the net opening into the housing is such that when the net is partially retracted into the housing, the effect is that the resilient hoop to which one side of the net is attached is substantially closed, thus making it unlikely that the fish can jump out of the net, or be lost therefrom during retrieve.

It is an important object of the present invention to provide a combination paddle and fish net structure which has great utility for use in fishing from a boat, both in providing manual locomotion for the boat at times when such is needed, and in providing a useful and functional fish net which can be used to land and boat a fish which has been caught following a strike.

Another object of the invention is to provide an easily used, lightweight structure which can function quite well either as a boat paddle, or as a fish landing net in another phase of the fishing activity.

A further object of the invention is to provide a combination fish net and paddle which is sufficiently rugged and sturdy in construction that it can be used for both the function of paddling a boat, and the function of landing a fish by use of the net, and can be so used over an extended period of time without mechanical malfunction or failure to perform the described functions efficiently.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

DETAILED DESCRIPTION OF A PREFERRED EMBODIMENT OF THE INVENTION

Figure 1:
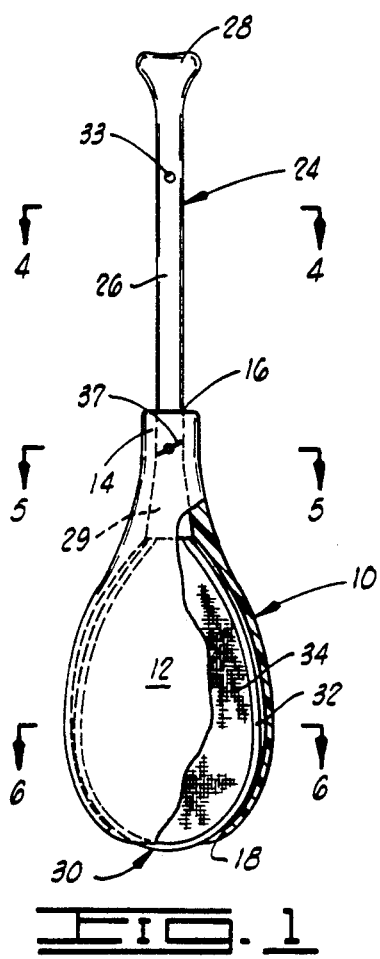
FIG. 1 is a side elevation view of the combination paddle-fishing net of the invention as it appears when it is configured for use as a paddle.

Referring initially to FIG. 1 of the drawings, the combination paddle and fish net of the invention is a hollow, paddle-shaped housing 10 which includes a base portion 12 and a truncated upper portion which terminates is an integrally formed, extended neck 14. The housing 10 has a hollow interior and defines a paddle opening 16 at one side thereof, and a net opening 18 at the opposite side thereof. In the neck portion 14, generally U-shaped cross-sectioned track elements 20 and 22 are secured to opposite sides of the housing 10 (see FIG. 5). These function to slidably receive one end portion of an elongated handle, designated generally by reference numeral 24, and to guide this handle during its movements relative to the housing.

Figure 4:
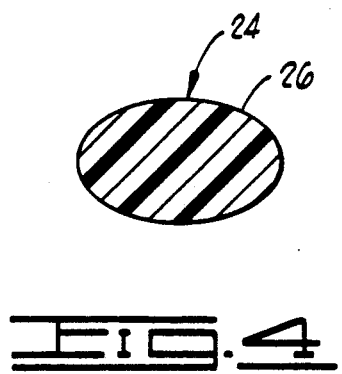
FIG. 4 is a sectional view taken along line 4—4 of FIG. 1.
Figure 5:
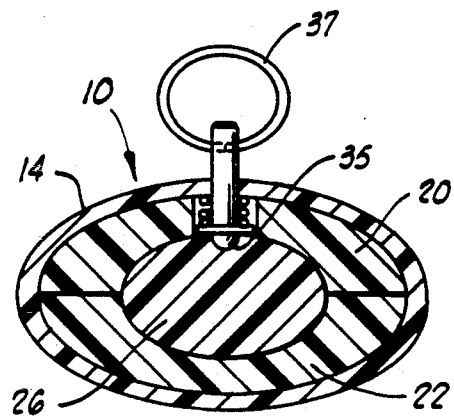
FIG. 5 is a sectional view taken along line 5—5 of FIG. 1.
Figure 6:
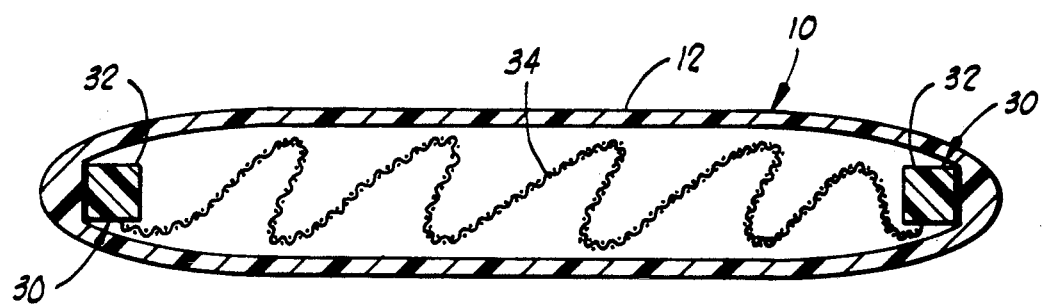
FIG. 6 is a sectional view taken along line 6—6 of FIG. 1.
Figure 7:
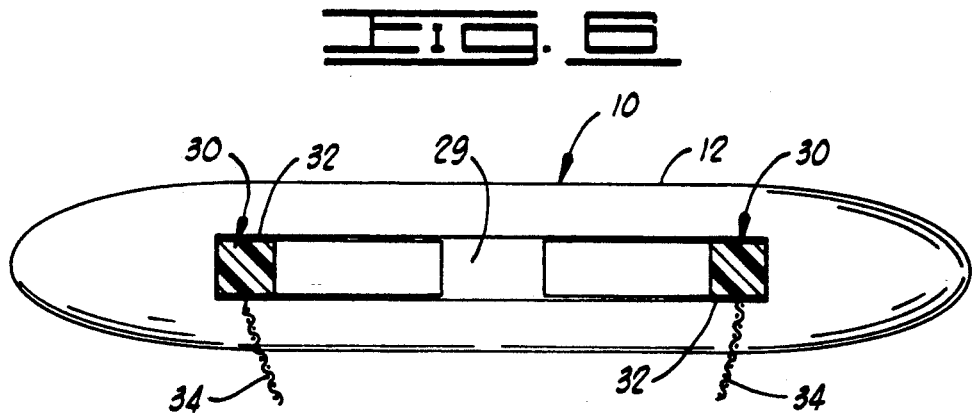
FIG. 7 is a sectional view taken along line 7—7 of FIG. 3.

The handle 24 includes a shaft 26 which is oval or elliptically shaped in cross-section, as shown in FIGS. 4 and 5 to afford easier gripping with the palm of the hand, and also includes a hand grip element 28 secured to the outer end of the shaft. Adjacent opposite ends of the shaft 26, a pair of spaced pin receiving detents or recesses 33 and 35 are formed in the shaft. These function at different times during operation of the invention to receive a spring biased locking pin 37 carried on the housing neck 14 and projecting through the track element 20 (see FIG. 5).

At the end portion 29 of the handle 24 which is inside the hollow housing 10, the handle is secured to one side of a fish net structure denominated generally by reference numeral 30. The fish net structure includes a circular or elliptical resilient hoop or rim 32 which is secured to, and movable with the inner end of the handle shaft 26. Secured by means of suitable eyes or loops to the hoop or rim 32 is an open mesh flexible landing net 34. At a time when the fish net structure 30 is fully retracted within the hollow housing 10, as shown in FIG. 1, the hoop or rim 32 is contracted or constricted so that it becomes elongated and will fit snugly and confined within the rigid housing 10. At this time, the paddle handle 24 is in its extended position so that its shank 26 extends upwardly outside the housing, and is accessible for use in paddling a boat.

When a fish has struck the bait of the fisherman and has been hooked, the fish is played until it is alongside the boat. At this time, the hand grip 28 is used to push the shank 26 of the handle 24 downwardly into the housing 10 until the handle has moved to approximately the position shown in FIG. 2. During this movement, the handle is guided by the track elements 20 and 22, and slidably reciprocates from the position shown in FIG. 1 to the position shown in FIG. 2.

Figure 2:
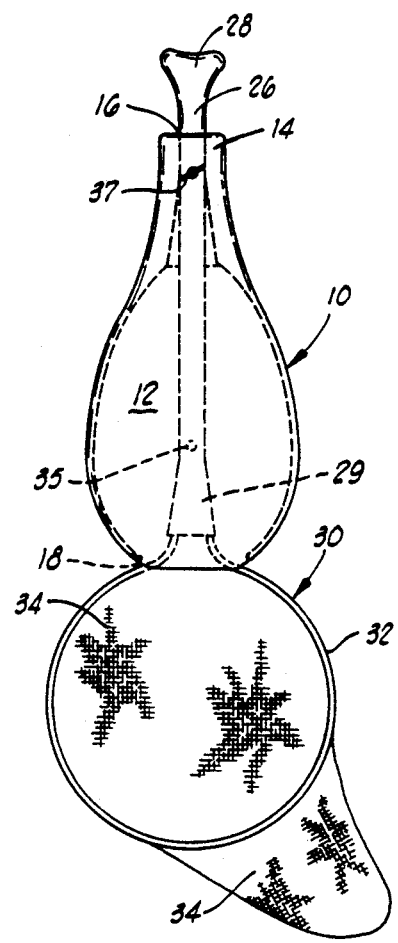
FIG. 2 is a side elevation view of the structure depicted in FIG. 1 when it has been re-arranged to a status where it is to be employed as a fish net for landing a fish which has been brought alongside a boat after a strike.

When the net structure 30 has reached the position shown in FIG. 2, the hoop or rim 32 springs outwardly to the expanded position depicted in FIG. 2, and the mesh landing net 34 extends or hangs downwardly from the hoop ready for netting the fish. At this time, the handle is locked in this position by the spring-biased pin 37 being forced into a second detent or recess 33 formed in the upper portion of the handle shank 26. The handle structure 24 is thus locked against reciprocating sliding movement relative in the housing 10, and this facilitates the use of the net structure in snaring the fish.

Figure 3:
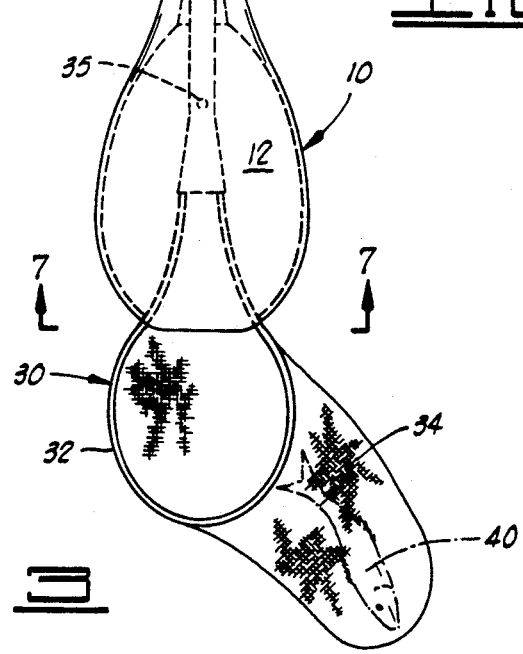
FIG. 3 shows a different status of the structure depicted in FIG. 1, in which different status the net has been caused to become nearly closed adjacent its open end to thus prevent the fish from escaping after the fish has been netted.

After the fish has been netted, the spring-biased pin 37 can be pulled up to release the handle 24 by extrication of the point of the pin from the detent or recess 33. The handle 24 can then be pulled from the position shown in FIG. 2 toward the position shown in FIG. 1. At some point, the resilient hoop 32 commences to enter the opening 18 formed in one side of the housing 10, and the hoop is thereby compressed or constricted to the position shown in FIG. 3. This narrows the opening at the upper end of the net so that a fish (shown in dashed lines and denominated by reference numeral 40) which has been netted cannot easily escape from the net. The combination paddle and fish net can then be used for landing the fish in the boat, and final release of the fish can be made easier by pushing the handle back toward the position shown in FIG. 2 to allow the hoop 32 to expand to the position shown in FIG. 2. This will allow the fish to be more easily removed from the net.

Although a preferred embodiment of the invention has been herein described in order to illustrate the principles underlying the invention, various changes and innovations can be effected in the described structure without departure from these principles. Modifications of this type are therefore deemed to be circumscribed by the spirit and scope of the invention except as the same may be necessarily limited by the appended claims or reasonable equivalents thereof.

What is claimed is:

1. A combination paddle-fish landing net comprising:

a hollow, rigid, paddle-shaped housing having a relatively narrow neck on one side of the housing which is narrower than the rest of the housing, and said neck defining a first opening into the hollow interior of the housing, said housing further having a second relatively larger opening into the hollow interior thereof on the opposite side of the housing from said neck and said first opening;

a handle including:
  a first, outer end;
  a second, inner end located inside said hollow housing;
  a shaft extending through said first relatively smaller opening and between said fist, outer end and said second inner end; and
  a hand rip element secured to said first, outer end; and a fish net structure secured to the second, inner end of said handle and located inside said housing in one position of the handle in which said combination paddle-fishing landing net is used as a paddle, and outside the housing after said handle is reciprocated relative to the housing to move said inner end in a direction away from said first opening toward said second opening so that said combination paddle-fish landing net then functions as a fish landing net, said fish net structure including:
  a resilient hoop which is resiliently expandable from an oval configuration in which said hoop will fit substantially entirely within said hollow rigid paddle-shaped housing into a circular configuration, and which hoop is secured at one of its sides to the second, inner end of said handle and is movable with said handle, said hoop being dimensioned in an open expanded status, and having a resiliency, such that said hoop and net can be compressed sufficiently to pass through said relatively larger opening into the hollow interior of said paddle-shaped housing as said hoop is retracted into said housing to convert the fish landing net to a paddle; and
  a flexible mesh net having an open end attached to said hoop and depending therefrom when the net is outside said housing to receive and net a fish passed through the hoop.

2. A combination paddle-fish landing net as defined in claim 1 and further characterized as including a pair of opposed guide elements located inside said housing in the neck thereof and cooperatively functioning to guide the reciprocating movement of said handle relative to said hollow housing, and to hold said handle in stable relationship to the housing when the handle is extended outwardly from the housing to the maximum extent.

3. A combination paddle-fish landing net as defined in claim 1 and further characterized as including means for locking said handle in a selected on of two alternate positions relative to said housing for enabling use of said combination as a paddle, or alteratively, as a fish landing net.

4. A combination paddle-fish landing net structure for alternate use as a fish landing net or as a paddle comprising:

a hollow rigid paddle-shaped housing having a neck on on side of the housing and defining a first opening into the hollow interior of the housing, said housing further having a second opening in the hollow interior thereof on the opposite side of the housing from said neck and said first opening;

a handle including:
 a first, outer end;
 a second, inner end located inside said hollow housing; and
 a shaft extending between said first, outer end and said second, inner end;
means inside said housing in the neck thereof for guiding the reciprocating movement of said handle relative to said hollow housing, and to hold the handle in a stable relationship to the housing when the handle is extended outwardly from eh housing to the maximum extent; and
a fish net structure secured to the second, inner end of said handle and located inside said housing in one position of the handle, and outside the housing after said handle is reciprocated relative to the housing to move said second inner end in a direction away from said fist opening toward said second opening, said fish net structure comprising:
 a resilient hoop which is resiliently expandable from an oval configuration configured to fit substantially entirely inside said paddle-shaped housing into a circular configuration in which the hoop functions as a part of an expanded fish net, said hoop being secured at one side to the second, inner end of said handle; and
 a flexible mesh net having an open end attached to said hoop and depending therefrom when the fish net is outside said housing to receive a caught fish passed through the hoop.

5. A combination paddle-fish landing net comprising:
a hollow rigid housing having a neck on one side of the housing and defining a first opening into the hollow interior of the housing, said housing further having a second opening into the hollow interior thereof on the opposite side of the housing from said neck and said first opening;
a handle including:
 a first, outer end;
 a second, inner end located inside said hollow housing;
 a shaft extending between said first and second ends, said shaft having a pair of axially spaced locking recesses therein;
 a hand grip element secured to said first outer end; and
a fish net structure secured to the second, inner end of said handle and located inside said housing in one position of the handle, and outside the housing after said handle is reciprocated relative to the housing to move said second inner end in a direction say from said first opening toward said second opening; and
a locking pin extending movably through said housing at a location to interlockingly enter alternately and successively each one of said recesses in said handle shaft as said handle is moved in reciprocation relative to said housing to cause said second inner end to move along a line between said first opening and said second opening.

6. A combination paddle-fish landing net as defined in claim 5 wherein said fish net structure includes:
a resilient hoop which is resiliently expandable from an oval configuration into a circular configuration and which is secured at one side of the second, inner end of said handle; and
a flexible mesh net having an open end attached to said hoop and depending therefrom when the net is outside said housing to receive a fish passed through the hoop.

7. A combination paddle-fish landing net as defined in claim 6 and further characterized as including a pair of opposed guide elements located inside said housing in the neck thereof and cooperatively functioning to guide the reciprocating movement of said handle relative to said hollow housing, and to hold said handle in a stable relationship to the housing when the handle is extended outwardly from the housing to the maximum extent.

* * * * *

UNITED STATES PATENT AND TRADEMARK OFFICE
CERTIFICATE OF CORRECTION

PATENT NO. : 5,157,854
DATED : October 27, 1992
INVENTOR(S) : Joseph F. Rumsey, Jr.

It is certified that error appears in the above-identified patent and that said Letters Patent is hereby corrected as shown below:

Column 1, line 7, after "as" and before "paddle", insert --a--.

Column 4, line 14, delete "fist" and insert --first-- therefor.

Column 4, line 16, delete "rip" and insert --grip-- therefor.

Column 4, line 56, delete "on" and insert --one-- therefor.

Column 4, line 64, delete "on", second occurrence, and insert --one-- therefor.

Column 5, line 11, delete "eh" and insert --the-- therefor.

Column 5, line 18, delete "fist" and insert --first-- therefor.

Column 6, line 13, delete "say" and insert --away-- therefor.

Signed and Sealed this

Fifth Day of October, 1993

Attest:

BRUCE LEHMAN

*Attesting Officer*   *Commissioner of Patents and Trademarks*